US005340005A

United States Patent [19]

Woods et al.

[11] Patent Number: 5,340,005

[45] Date of Patent: Aug. 23, 1994

[54] FABRIC ACCESSORIES FOR CRUTCHES AND WALKERS, PROVIDING CARRYING EXPANDABLE VOLUMES FOR PERSONAL USE ITEMS AND SHOPPING ITEMS, AND PRESENTING REFLECTIVE FABRIC PORTIONS THEREOF FOR OBSERVATION BY OTHERS

[76] Inventors: Robert D. Woods, 231 Park Ave. S., North Bend, Wash. 98045; Sandra E. Radcliffe, 19119 68th Pl. W., Lynnwood, Wash. 98036

[21] Appl. No.: 888,353

[22] Filed: May 21, 1992

[51] Int. Cl.[5] .................... B60R 11/00

[52] U.S. Cl. .................... 224/42.46 R; 224/0.5; 135/66; 135/67; 135/68

[58] Field of Search .................... 224/273, 42.46 R, 0.5; 135/66, 68, 67, 65; 383/120, 76, 22; 150/154

[56] References Cited

U.S. PATENT DOCUMENTS

| | | | |
|---|---|---|---|
| 2,431,030 | 11/1947 | Edwards | 383/76 |
| 3,116,773 | 1/1964 | Kikas | 383/22 |
| 3,545,462 | 12/1970 | O'Mahoney | 135/47 |
| 4,027,687 | 6/1977 | McGowan | 135/68 |
| 4,289,156 | 9/1981 | Ulics | 135/66 |
| 4,850,383 | 7/1989 | McBride | 135/66 |
| 5,012,963 | 5/1991 | Rosenbaum | 224/42.46 R |
| 5,040,711 | 8/1991 | Niederhauser et al. | 224/42.46 R |

FOREIGN PATENT DOCUMENTS

| | | | |
|---|---|---|---|
| 2577395 | 8/1986 | France | 135/66 |

*Primary Examiner*—Linda J. Sholl

*Attorney, Agent, or Firm*—Roy E. Mattern, Jr.

[57] ABSTRACT

Reflective fabrics are used extensively throughout strong, expandable, selectively and resiliently restrained, fabric accessories for removable securement to crutches and walkers, to provide expandable carrying volumes for personal use items and shopping items, while at the same time presenting the reflective fabric portions to be readily observed, especially by operators of vehicles.

6 Claims, 5 Drawing Sheets

FIG. 13
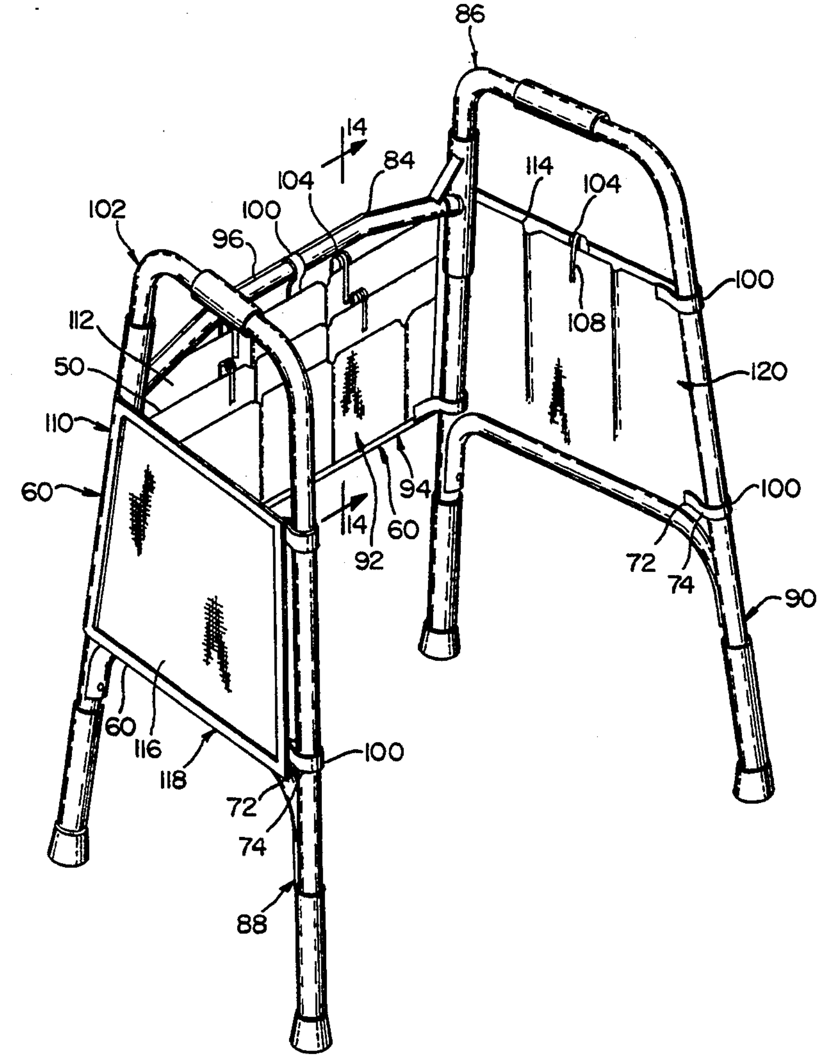
FIG. 14
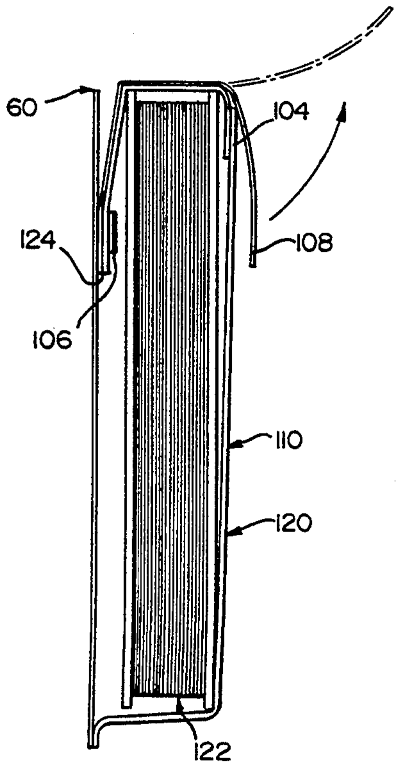
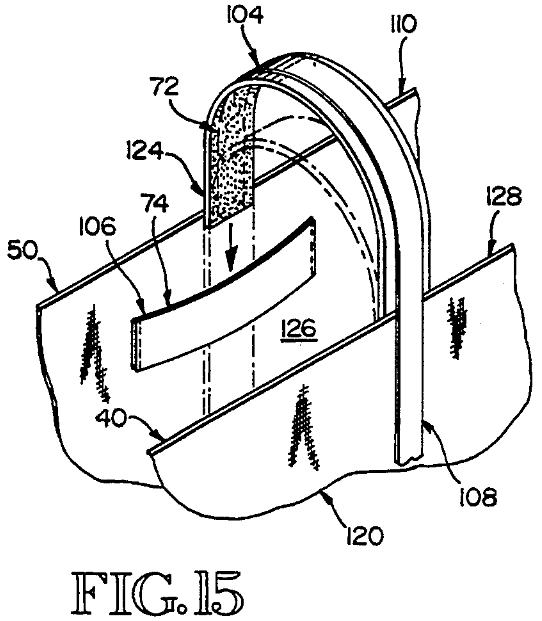
FIG. 15

FABRIC ACCESSORIES FOR CRUTCHES AND WALKERS, PROVIDING CARRYING EXPANDABLE VOLUMES FOR PERSONAL USE ITEMS AND SHOPPING ITEMS, AND PRESENTING REFLECTIVE FABRIC PORTIONS THEREOF FOR OBSERVATION BY OTHERS

BACKGROUND

Temporarily or permanently handicapped persons, who must use crutches and/or walkers, have in the past and today been given the opportunity of attaching accessories to either their crutches or their walkers, enabling them to carry their personal items and shopping items. In respect to some of these accessories:

In 1947 in U.S. Pat. No. 2,423,635, Ferdinand H. Blum illustrated and described his crutch attachment providing an elongated horizontal pocket supported just below the crutch handle. A base holder is fastened about the spaced upper leg portions of the crutch, and thereafter the elongated horizontal pocket is removably secured to the base holder;

In 1956 in U.S. Pat. No. 2,750,951, Dorothy J. Barnwell illustrated and described her article carrying attachment for crutches. Her solid open top box has curved wire hooks secured to the box and then extended for hanging over the crutch handle, and about the spaced depending leg portions;

In 1970 in U.S. Pat. No. 3,545,462, Richard A. O. Mahoney illustrated and described his wire basket for attachment to a single pole forearm crutch;

In 1976 in U.S. Pat. No. 3,957,071, M. Beatrice Kenner illustrated and described her carrier attachment for invalid walkers. She removably attached to a walker a combination of a rigid tray and a depending pocket. The tray, when in use, is supported by the spaced handles and the top cross bar of the walker. When the tray is not in use, it hangs down from the top cross member of the walker;

In 1977 in U.S. Pat. No. 4,027,687, Mallissa A. McGowan illustrated and described her protective and/or decorative cover for walking aids. She provides an essentially full outer cover for a crutch, leaving the crutch handle and foot uncovered;

In 1979 in U.S. Pat. No. 4,146,045, Donald A. Grant illustrated and described his crutch carry-all attachment made of firm plastic with opened grooves to receive the side dual leg portions of a crutch;

In 1980 in U.S. Pat. No. 4,184,618, Marjorie F. Jones illustrated and described her article carrying attachment for walkers. She provides a firmly constructed compartmented horizontal caddy suspended by hooks from the top cross member of the walker;

In 1981 in U.S. Pat. No. 4,289,156, George Ulies illustrated and described his crutch attachment which is a firm compartmented container suspended from the cross bolt connecting the handle of the crutch to the spaced upper side leg portions of the crutch. By using an additional curved hook, he suspends his firm compartment to the top transverse cross member of a walker;

In 1981 in U.S. Pat. No. 4,295,483, Samuel W. Smith illustrated and described his crutch-mounted accessory pouch to fit within the spaced upper leg portions of a Y-type crutch. His pouch is supported by using a transverse member secured in unused holes, which were available for positioning a handle of the crutch in respect to the hand height of the person using the crutch;

In 1989 in U.S. Pat. No. 4,850,383, Kay K. McBride illustrated and described her crutch bag for hanging from the crutch handle and conforming to the crotch area of a crutch. The base is tied about the spaced upper leg portions, near where the single crutch leg portion commences. The bag top entry is closed and opened by using a thistle-type fastener;

In 1990 in U.S. Pat. No. 4,974,620, Marie A. F. Quillan illustrated and described her invalid walker and seat. She provides a strong band of material that is removably supported between the top longitudinal hand gripping rails of a walker, to thereafter serve as a seat, and also to provide support for pockets;

In 1990 in U.S. Pat. No. 4,974,760, Patricia H. Miller illustrated and described her article carrier for a walker made of flexible material and removably suspended from the transverse cross brace member of the walker; and In 1991 in U.S. Pat. No. 5,012,963, Patricia Rosenbaum illustrated and described her walker supported tote bag having one large inner compartment and several outer multicolored pockets, all made of flexible materials. As an overall unit, this tote bag is supported by straps from the top front cross member and the side braces of the walker.

These inventors and other inventors have provided temporary and permanently handicapped persons with accessories for crutches and walkers, to thereby enable these persons to carry with them their personal belongings more conveniently. In spite of their fine accessories, more accessories are needed to provide greater convenience, comfort and safety with respect to the needs of these handicapped persons.

SUMMARY

Features of Both Crutch and Walker Accessories

Accessories for crutches and walkers are made and used to provide greater safety of handicapped persons by including reflective flexible materials, which are readily observable by operators of vehicles. In addition, some portions of the accessories are made of flexible liquid containing materials. Moreover, the compartments are made of flexible materials and pleated for their controlled expansion to receive larger items. Elastic members are added to tend to keep the pleated materials together. Also adjustable length supports are spaced to keep the top entries of opened top compartments, as limited in their opening as possible, when large items are being carried, so they will not fall out. In addition, the range of resilient materials used, include heavy duty fabrics for constant use by one particular handicapped person, and strong, but light duty fabrics, easily washed in hospital washing machines, for their reuse by several hospital patients in respective different periods of time.

The Crutch Accessory

In addition to the features to be found in respect to the accessories for both the crutch and the walker, the overall flexible materials used for the crutch accessory extensively cover each crutch, making each crutch more comfortable to use, and also arranging the reflective materials over a larger area for their better observation by operators of vehicles.

The Walker Accessory

In addition to the features to be found in respect to the accessories for both the crutch and the walker, the flexible materials used in making the walker accessories, extend both transversely and longitudinally, thereby providing more conveniently expanded volume compartments, and also providing for the arrangement of more reflective materials over a larger area for their better observation by operators of vehicles.

DRAWINGS

These accessories for crutches and walkers are illustrated in the drawings, wherein.

Figure 2:
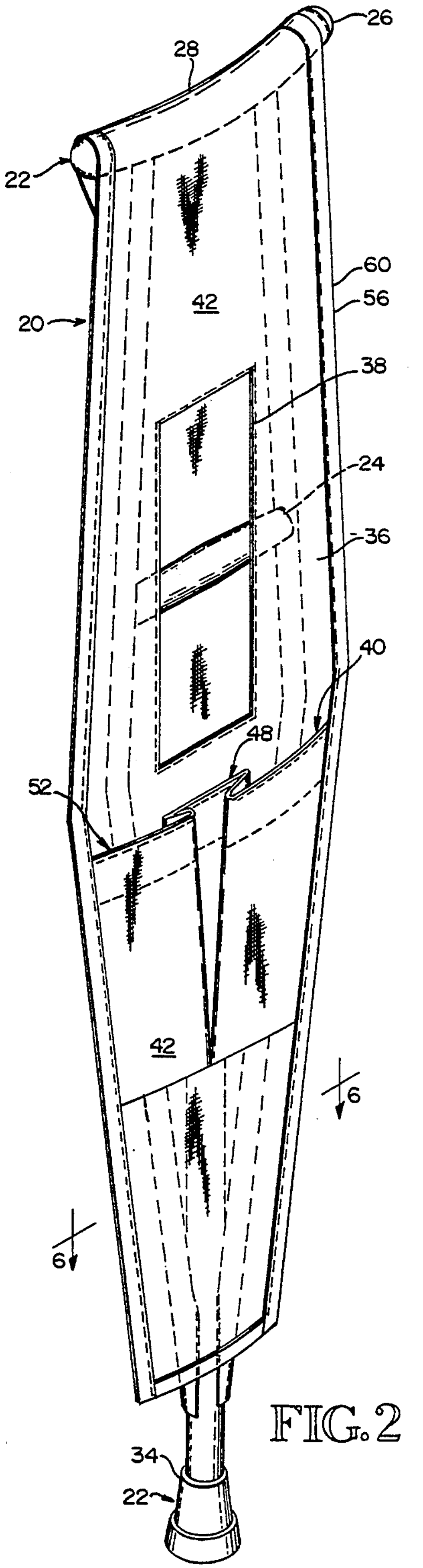
FIG. 2 illustrates one of the crutches, shown in FIG. 1, essentially covered by the flexible material, leaving only the handle and the bottom portions of the crutch uncovered, and showing the bordering edges made of reflective materials, and also showing the pleated expandable volume pocket or compartment.
Figure 3:
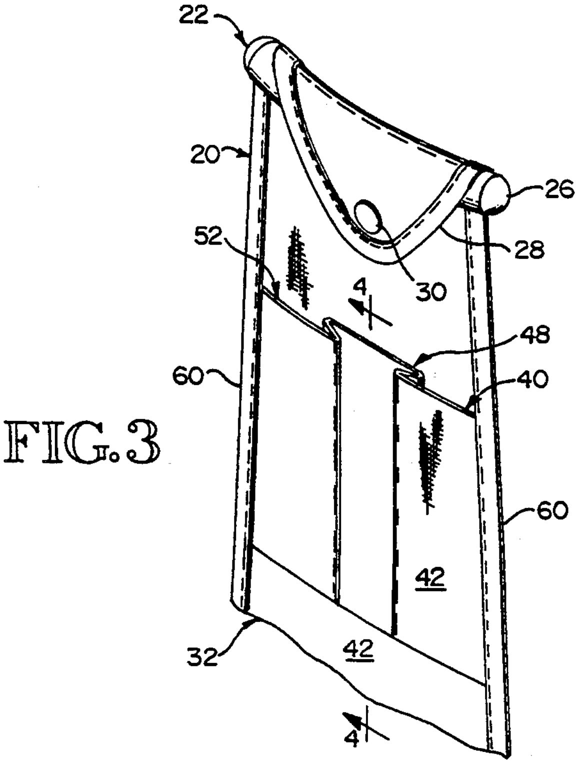
FIG. 3 illustrates the top portion of the crutch, shown in FIG. 2, in reference to the side of the crutch to be positioned adjacent to a person's body, indicating the fold over top flap of the flexible material, which is held in place by a snap fastener, to thereby position this crutch accessory on a crutch, and indicating another pleated expandable volume pocket or compartment.
Figure 4:
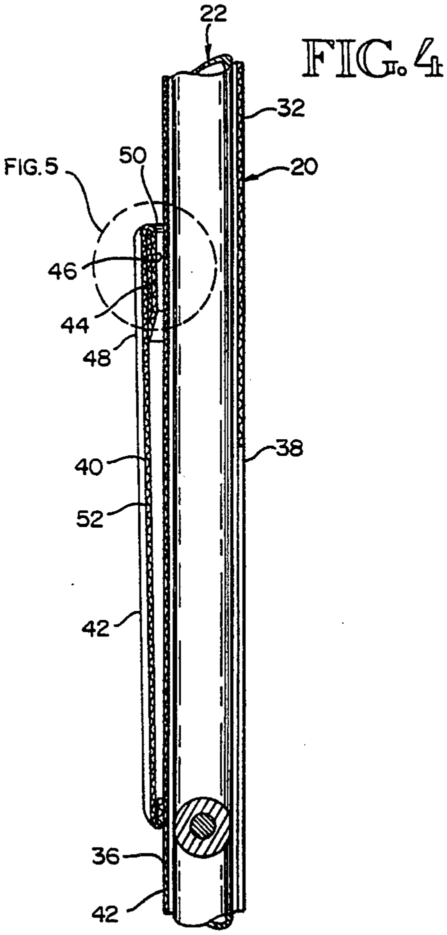
Figure 5:
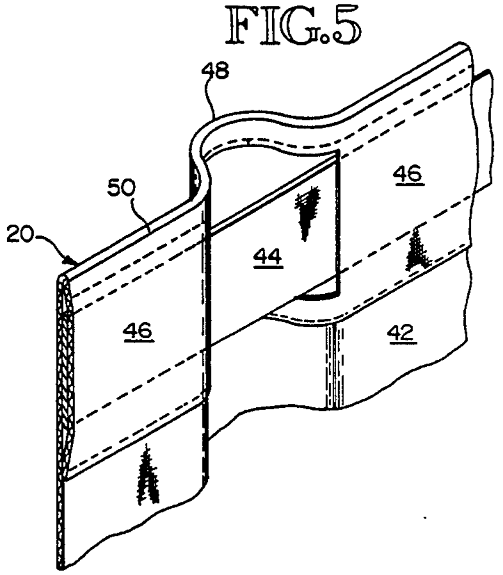
Figure 6:
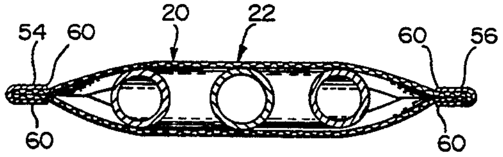
Figure 7:
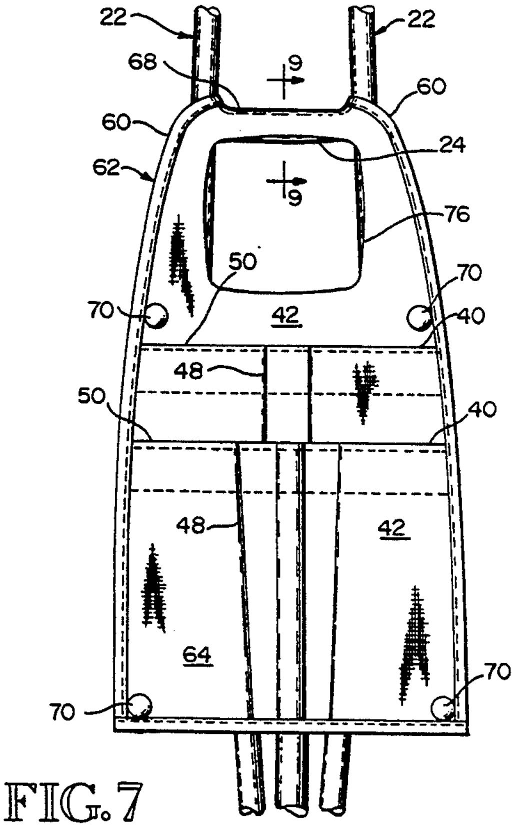
Figure 8:
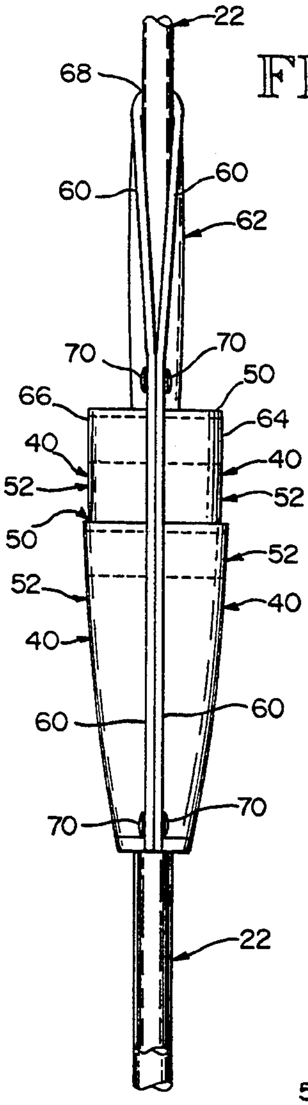
Figure 9:
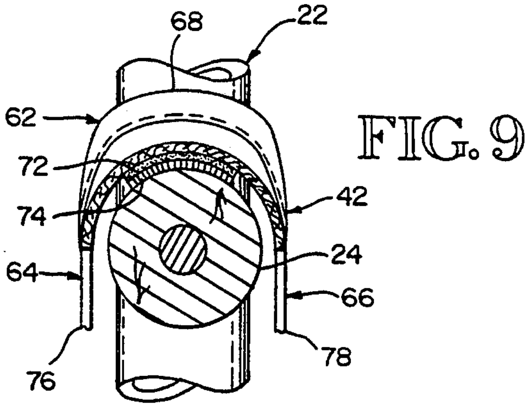
Figure 10:
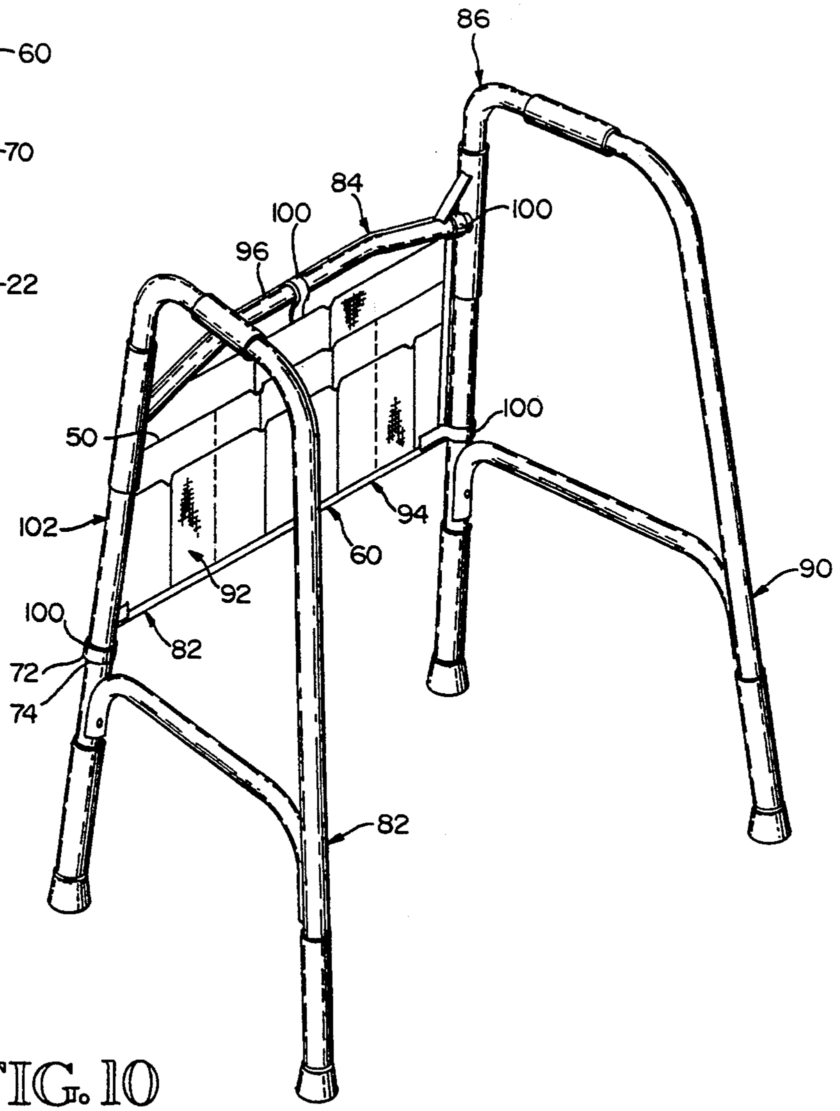
Figure 11:
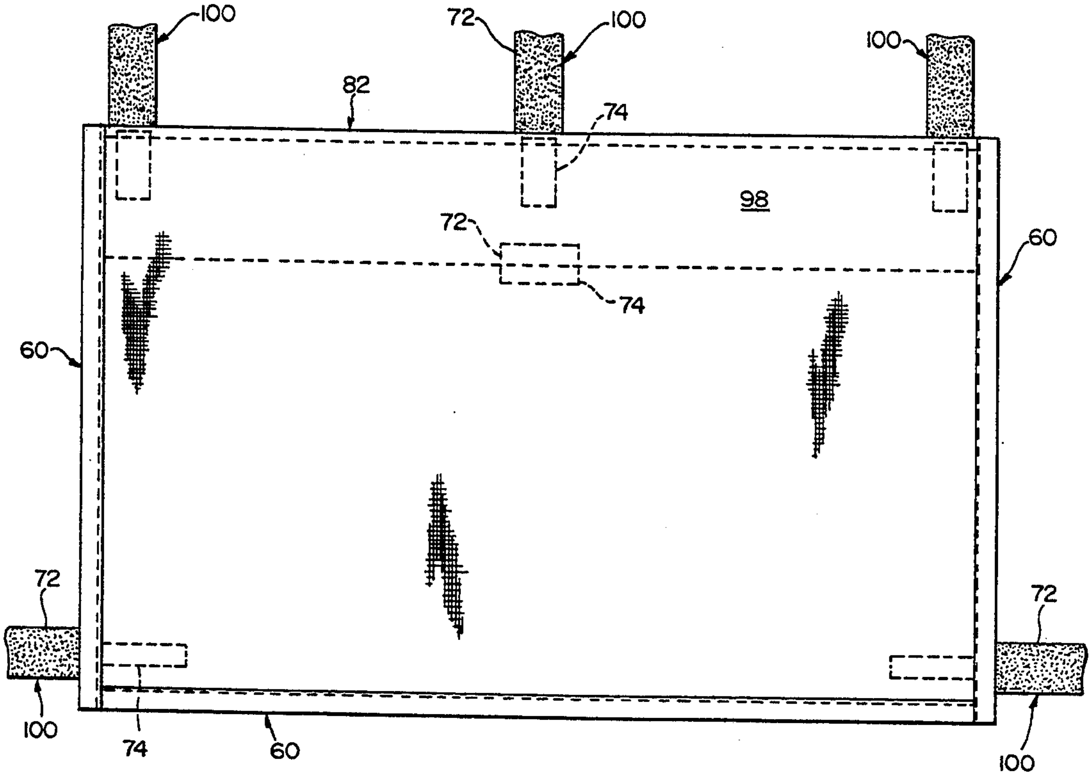
Figure 12:
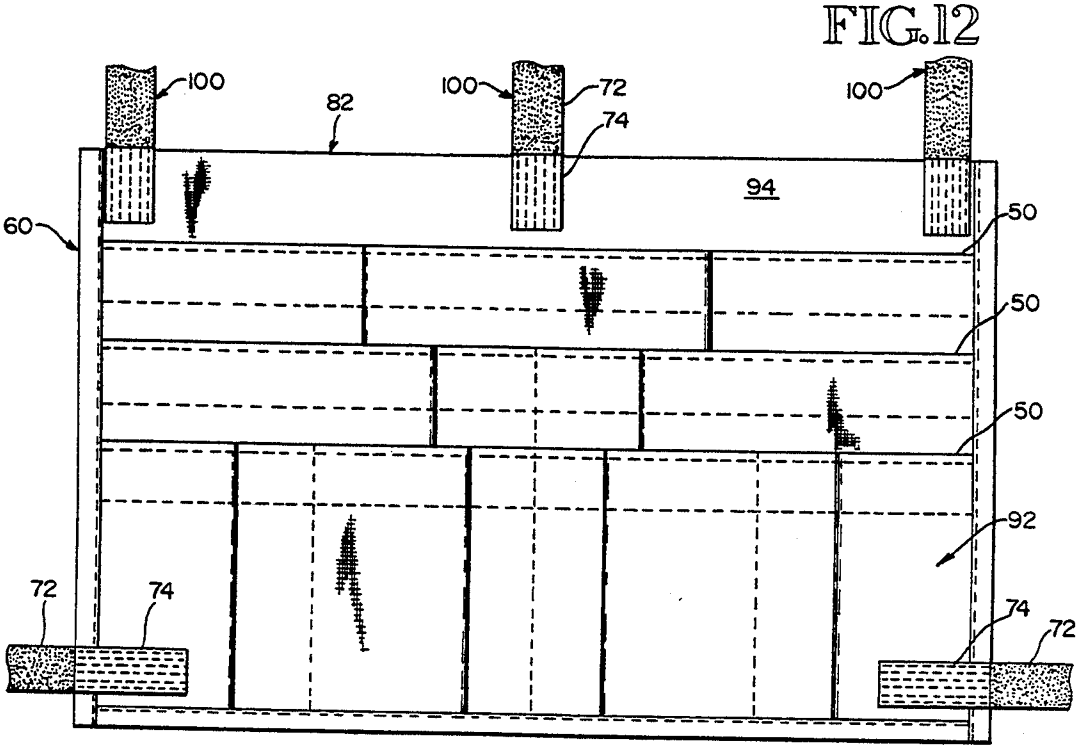

FIG. 4 is a partial sectional view, taken along line 4—4 of FIG. 3, to particularly illustrate how the flexible material surrounds the crutch, while still leaving the outside handle access rectangular area, and also provides support for the expandable pockets or compartments, which are held in a closed position at their tops by using elastic members in conjunction with pleated arrangements of the flexible material;

FIG. 5 is a partial perspective view of the illustrated volume, indicated by the circular dotted line on FIG. 4, illustrating the elastic members used in conjunction with the pleated arrangements of the flexible material, which keep the top entry of the pocket closed, until intentionally opened to receive a personal item of the person using the crutches;

FIG. 6 is a cross sectional view, taken along line 6—6 of FIG. 2, to illustrate how the flexible materials surround these lower crutch portions, and present the reflective edge materials for their observation in either direction by operators of vehicles;

FIG. 7 is a partial outer side view of a crutch and another embodiment of a crutch accessory, and the inner side view appears the same, of this arrangement of expandable pockets, which are positioned over the handle of the crutch to depend below on each side, with each alike side to be snapped together, using the four sets of snap fasteners;

FIG. 8 is a partial side view of a crutch and the embodiment of the crutch accessory, illustrated in FIG. 7, showing how the expandable pockets are arranged on each side below the through-access for a person's hands, as first shown in FIG. 7, when he or she will be gripping the handle of the crutch;

FIG. 9 is a partial sectional view, taken on line 9—9 of FIG. 7, to illustrate how hook and loop fastener components are respectively secured to the handle of the crutch and to the handle contacting portions of the flexible material, to thereby holdably position this flexible material on the handle, and to keep the entire accessory in position on the crutch;

FIG. 10 is a perspective view of a walker equipped with another embodiment of these accessories, which is particularly designed for walkers, with expandable compartments being arranged transversely with reflective materials to be seen by operators of vehicles approaching from the front of the walker being used by the handicapped person;

FIG. 11 is an elevational view of the transverse portion of the walker embodiment, shown in FIG. 10, as it will be viewed from the front of the walker;

FIG. 12 is an elevational view of the transverse portion of the walker embodiment, shown in FIG. 10, as it will be viewed from the rear of the walker, illustrating the many pockets, which are expandable compartments, that are equipped with the elastic materials and adjustable effective length strap materials, in turn equipped with hook or loop fasteners;

FIG. 13 is a perspective view of a walker equipped with another embodiment of these accessories, and especially another embodiment for a walker, with expandable compartments being arranged both transversely and longitudinally, and thereby also providing more reflective materials to be seen by operators of vehicles approaching from the front or the sides of the walker, being used by the handicapped person, and the transverse portion is similar to the transverse portion illustrated in FIGS. 10, 11, and 12, and the longitudinal portions are likewise equipped with pleats, elastic members, and adjustable effective length strap materials, in turn equipped with hook or loop fasteners;

FIG. 14 is a partial sectional view taken along line 14—14 of FIG. 13, illustrating how a book is carried in a pocket of an expandable compartment of the transverse portion of either embodiment, shown in FIGS. 10 or 13, or other embodiments, and also illustrating how the strap materials, in turn equipped with hook or loop fasteners, are arranged to keep the top opening of the pocket reduced in size; and FIG. 15 is a perspective partial view, illustrating the use of an adjustable effective length strap material, equipped with hook or loop fasteners, in conjunction with a receiving loop, also having hook or loop fasteners, to keep the top opening of the pocket reduced in size, and showing how a releasing elongated finger gripping pull tab is used in releasing the adjustable effective length strap material from the receiving loop, when an object such as the book, is to be withdrawn from the pocket.

DESCRIPTION OF THE PREFERRED EMBODIMENTS

General Description

The fabric accessories for crutches and walkers, which all preferably present reflective fabric portions for observation by others, and especially persons operating motor vehicles, are illustrated throughout the drawings. They all have pockets, which are highly expandable by using pleats. Yet, when not in use or lightly loaded, elastic members tend to keep tile pleated materials together. Also adjustable length straps, preferably fastened by using hook and loop fasteners, serve to keep the top openings of larger pockets, when loaded, reasonably narrower, to in turn retain the contents placed in them by the handicapped persons using these crutches or walkers equipped with these fabric accessories.

The Essentially Full Cover Crutch Accessory

Figure 1:
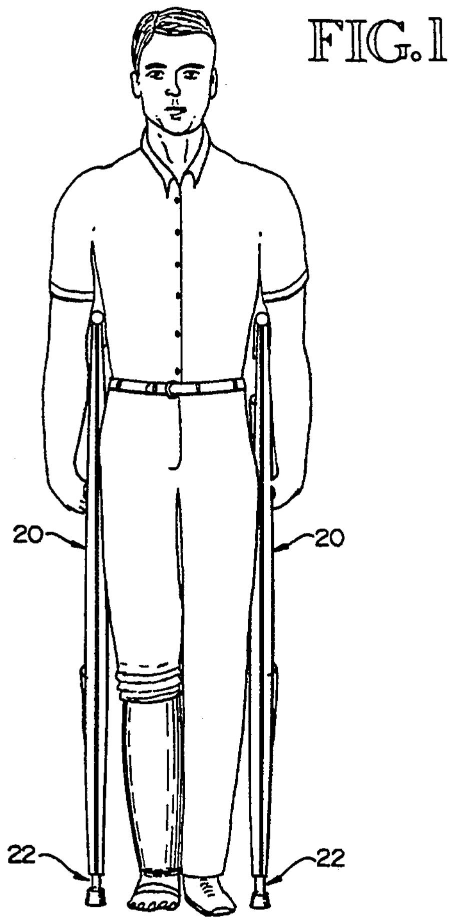
FIG. 1 illustrates a person, temporarily handicapped by an injury, using crutches which are essentially covered by flexible material arranged with pockets, which are expandable to create larger compartments.

In FIGS. 1 through 6, the essentially full cover crutch accessory 20 is illustrated. The crutches 22, so covered, are used, as shown in FIG. 1, in the same manner as uncovered crutches 22. The handles 24 of the crutches 22 remain exposed sufficiently so the handicapped person's hands adequately grip them as shown in FIG. 2. The shoulder supports 26 of the crutches 22 are covered by a fold over tab 28 portion of this full cover crutch accessory 20, which is secured by using a snap fastener 30, as shown in FIG. 3.

The snap fastener 30 is located on the inner side 32 of this full cover crutch accessory 20, which covers essentially the entire inner side of the crutch 22, except for the foot end portions 34 of the crutch 22. In contrast, the outer side 36 of this full cover crutch accessory 20, has a rectangular opening 38, which provides hand access to the crutch handle 24. Both the inner side 32 and the outer side 36 have pockets 40 made of expandable pleated flexible materials 42, as shown in FIGS. 2, 3, 4, and 5.

As particularly shown in FIGS. 4 and 5, an elastic member 44 is, in part, sewn within a fold over portion 46 of the flexible material 42, near the top of each pleated portion 48, to thereby always tend to keep the top opening 50 of each pocket 40, as small as possible, while letting the pocket 40 expand into a variable receiving volume compartment 52, i.e. a larger volume pocket 40.

As indicated in FIG. 6, the flexible material 42 fully surrounds the crutch 22. At the respective joining edges 54, 56, respectively being a leading edge 54 or a trailing edge 56, of the flexible materials 42, these joining edges are fully surrounded by a reflective material 60, which is thereafter readily observed by other persons, and particularly by the operators of oncoming vehicles.

The Partial Cover Crutch Accessory

In FIGS. 7, 8, and 9, a partial cover crutch accessory 62 is illustrated. Each of the sides 64, 66 are essentially identical in appearance. They are integrally joined at the top 68, as this entire accessory 62 is made to be folded and draped over the handle 24 of the crutch, and thereafter snapped in place by utilizing the snap fasteners 70. Preferably, hook and loop fastener components 72, 74 are used to keep the top 68 of this accessory located directly over the top of the handle 24 of the crutch 22.

Respective access openings 76, 78 are provided on respective sides 64, 66 of this partial cover crutch accessory 62, so the hands of the handicapped person may be conveniently positioned about the handles 24 of the crutches 22. The pockets 40 also have pleated portions 48 equipped with elastic members 44, to create variable receiving volume compartments 52. Also reflective materials 60 are sewn in place to be observed by other persons, and especially by operators of vehicles.

A Walker Accessory

As illustrated in FIGS. 10, 11, and 12, a walker accessory 82 is illustrated, which extends across the front 84 of a walker 86. The flexible material 42 is arranged with spaced pleated portions 48, which are all equipped with respective elastic members 44. Also the flexible material 42 is arranged in groups of layers to create a series 94 of layered pockets 40, as shown in FIG. 12. This series 92 of the layered pockets 40, preferably is positioned on the inside 94 of the transverse portion 96 of this walker accessory 82, as shown in FIG. 12. The outside 98 of this transverse portion 96 is preferably smooth in appearance, as illustrated in FIG. 11.

Positioning straps 100, equipped with respective hook 72 and loop 74 fastener portions, are spaced apart at selected locations to secure this walker accessory 82 to the respective frame members 102 of the walker 86. Also respective hook 72 and loop 74 fastener portions are spaced along the respective top openings 50 of the layered pockets 40 to keep them closed, when empty, or when only lightly loaded with a small item or small items.

Another Walker Accessory

As illustrated in FIGS. 13, 14, and 15, another walker accessory 110 is illustrated, which extends both across the front 84 of a walker 86, and also along the respective sides 88, 90 of the walker 86. The flexible material 42 is arranged with spaced pleated portions 48, which are all equipped with respective elastic members. The transverse portion 112 of this walker accessory 100, is like the transverse portion 96 extending across the walker accessory 82, shown in FIG. 10. The flexible material 42 in this transverse portion 112 is also again arranged in groups of layers to create a series 94 of layered pockets 40, as shown in FIG. 12. The outside 98 of this transverse 112, is also preferably smooth in appearance, as shown in FIG. 11.

This transverse portion 112, preferably integrally continues on along each respective side 88, 90 of the walker 86 providing a large expandable inside pocket 114 on each side, while presenting a smooth appearance on the outside 116 of each respective side 118, 120 of this walker accessory 110. Positioning straps 100, equipped with respective hook 72 and loop 74 fastener portions, are spaced apart at selected locations to secure this walker accessory 110 to the respective frame members 102 of the walker 82. Also respective hook 72 and loop 74 fastener portions are spaced along the respective top openings 50 of the layered pockets 40, or other pockets, as needed, to keep them closed, when empty, or when only lightly loaded with a small item or small items.

In reference to all the embodiments of these fabric accessories for crutches and walkers, and especially in reference to these two walker accessories 82, 110, when any of these layered pockets are filled with a larger item or larger items, such as a book 122, or books 112, as shown in FIG. 14, the top openings 50 are optionally closed or partially closed by using adjustable length straps 104 in combination with receiving strap loops 106, which are both equipped with respective hook 72 or loop 74 fasteners. Preferably, the free ends 124 of the adjustable length straps 104 are equipped with pullable elongated finger tabs 108. After the secured adjustable length straps 104 have temporarily served their purpose to close or tend to close the openings 50, the release of these straps 104 is more conveniently undertaken by pulling on the pullable elongated finger tabs 108. The edges of walker accessory 110, and also the walker accessory 82 are covered by a reflective material 60, which will be seen by the operator of a vehicle.

Further Comments Regarding These Fabric Accessories For Crutches and/or Walkers As noted, preferably at least all of the edges are covered with reflective material 60, in respect to all these fabric accessories, which will be used outside of dwellings. Preferably, for each particular long time owner of one of these fabric accessories, the overall material used will be a heavy duty material.

However, for use by a patient in a hospital, who will be temporarily using one of these fabric accessories in a hospital, the material will be strong but light weight and suitable for laundering in the washing machines in the hospital. If these hospital owned fabric accessories for crutches or walkers are to be always used in the lighted rooms and hallways of the hospital, then reflective materials might not be included in these hospital owned fabric accessories.

Selectively, the interior of some pockets 40, is lined with or coated with a liquid proof material 126. In these pockets 40, so lined with liquid proof material 126, the handicapped persons may place items which could possibly leak, or which are wet or damp when initially placed in a lined pocket 128.

The use of these fabric accessories 20, 62, 82, and 110, for crutches or walkers, in respect to use of reflective material 60, increases the safety of the handicapped persons using them during their slower but important travel. Also, all of these respective accessories have conveniently used pockets to securely receive and to hold many important personal property items, of the respective handicapped persons, which may considerably vary in weight and size. Yet at all times, the main motion functions of either crutches or the walkers are not hindered. Moreover these fabric accessories are easily and quickly secured and easily and quickly removed from either crutches or the walkers, without altering the crutches or the walkers in any way, and without the need for using any tools.

I claim:

1. A fabric accessory for a crutch providing carrying expandable volumes for personal use items and shopping items, comprising:

a. fabric materials sewn: to telescopically receive a crutch inserted first by the entry of a foot end of a crutch into a top opening of these fabric materials of the fabric accessory; to almost completely enclose a crutch, leaving an opening at the bottom for a foot end portion of a crutch, and leaving a limited opening, accessible from one side only, by a crutch handle, so a crutch handle may be gripped; to provide pockets serving as carrying expandable volumes for personal use items and shopping items; and to provide a fold over tab portion for folding over the top of the crutch; and b. a fastener assembly to keep the fold over tab portion in position over the top of the crutch, and thereby keep this fabric accessory in position around a crutch.

2. Fabric accessory for a crutch, as claimed in claim 1, comprising in addition, reflective materials sewn to the fabric materials at selected locations to be observed by operators of motor vehicles.

3. Fabric accessory for a crutch, as claimed in claim 2, wherein the fabric materials sewn to provide pockets, are pleated in at least one location.

4. Fabric accessory for a crutch, as claimed in claim 3, comprising in addition, elastic materials which are sewn to the fabric materials nearby the pleated portions, thereby tending to keep the pleated portions together, until they are intentionally expanded.

5. Fabric accessory for a crutch, as claimed in claim 4, comprising in addition, an adjustable length strap and a complementary receiving strap loop, respectively having hook or loop fasteners, sewn to the fabric materials at selected pocket locales to partially close the otherwise fully opened top of a pocket.

6. A fabric accessory for a crutch, as claimed in claim 1, wherein the pockets are arranged as two pockets, one of which is on one side of a crutch at one elevation, and the other of which is on an opposite side of a crutch at another elevation.

* * * * *